(12) United States Patent
Hossain et al.

(10) Patent No.: US 8,707,264 B2
(45) Date of Patent: Apr. 22, 2014

(54) METHODS AND SYSTEMS FOR TESTING METHODS IN A MULTI-TENANT DATABASE ENVIRONMENT

(75) Inventors: Fiaz Hossain, San Francisco, CA (US); Richard Unger, Seattle, WA (US)

(73) Assignee: salesforce.com, inc., San Francisco, CA (US)

(*) Notice: Subject to any disclaimer, the term of this patent is extended or adjusted under 35 U.S.C. 154(b) by 477 days.

(21) Appl. No.: 12/973,660

(22) Filed: Dec. 20, 2010

(65) Prior Publication Data
US 2011/0289356 A1 Nov. 24, 2011

Related U.S. Application Data

(60) Provisional application No. 61/345,979, filed on May 18, 2010.

(51) Int. Cl.
*G06F 9/44* (2006.01)

(52) U.S. Cl.
USPC .......................... 717/124; 717/126; 717/131

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

FOREIGN PATENT DOCUMENTS

| | | | | |
|---|---|---|---|---|
| EP | 0240663 | * | 2/1987 | .............. G06F 11/00 |
| EP | 0240663 | * | 5/1987 | .............. G06F 11/00 |

OTHER PUBLICATIONS

Salesforce.com to roll out 'Apex' programming language—by Marc L. Songini—Oct. 11, 2006 12:00 PM ET, Computerworld.*

*Primary Examiner* — Don Wong
*Assistant Examiner* — Hossain Morshed
(74) *Attorney, Agent, or Firm* — Blakely, Sokoloff, Taylor & Zafman

(57) ABSTRACT

In accordance with embodiments disclosed herein, there are provided systems, devices, and methods for testing methods in a multi-tenant database environment, including, for example, hosting a plurality of customer codebases within a host organization, where each of the plurality of customer codebases includes a plurality of operational statements and one or more test methods. Such a method further includes generating a first test result set by executing the one or more test methods associated with each of the plurality of customer codebases against a production release codebase of the host organization; generating a second test result set by executing the one or more test methods associated with each of the plurality of customer codebases against a pre-release codebase of the host organization; and identifying errors associated with the pre-release codebase based on a comparison of the first test result set and the second test result set.

20 Claims, 6 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,290,145 B2 * | 10/2007 | Falkenthros ............... 713/182 |
| 7,340,411 B2 | 3/2008 | Cook |
| 7,620,655 B2 | 11/2009 | Larsson et al. |
| 7,774,460 B2 * | 8/2010 | Adelman et al. ............ 709/224 |
| 7,930,344 B2 * | 4/2011 | Chidambaran et al. ...... 709/203 |
| 7,954,088 B2 * | 5/2011 | Crawford .................... 717/126 |
| 8,266,266 B2 * | 9/2012 | Short et al. .................. 709/223 |
| 8,381,184 B2 * | 2/2013 | Johnson et al. ............. 717/124 |
| 2001/0044791 A1 | 11/2001 | Richter et al. |
| 2001/0044840 A1 * | 11/2001 | Carleton ..................... 709/223 |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015868 A1 * | 1/2004 | Dutta et al. .................. 717/126 |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0167749 A1 * | 8/2004 | Friedman et al. ............ 702/186 |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0101436 A1 * | 5/2006 | Anderson et al. ........... 717/141 |
| 2007/0300215 A1 * | 12/2007 | Bardsley ..................... 717/168 |
| 2008/0147753 A1 * | 6/2008 | Chasman et al. ............ 707/203 |
| 2008/0270459 A1 * | 10/2008 | Grewal et al. ............ 707/103 R |
| 2010/0211548 A1 * | 8/2010 | Ott et al. ..................... 707/655 |
| 2011/0265069 A1 * | 10/2011 | Fee et al. .................... 717/151 |
| 2011/0289356 A1 * | 11/2011 | Hossain et al. ............. 714/38.1 |
| 2012/0124573 A1 * | 5/2012 | Mamtani et al. ................ 718/1 |
| 2012/0284312 A1 * | 11/2012 | Gore et al. .................. 707/810 |

\* cited by examiner

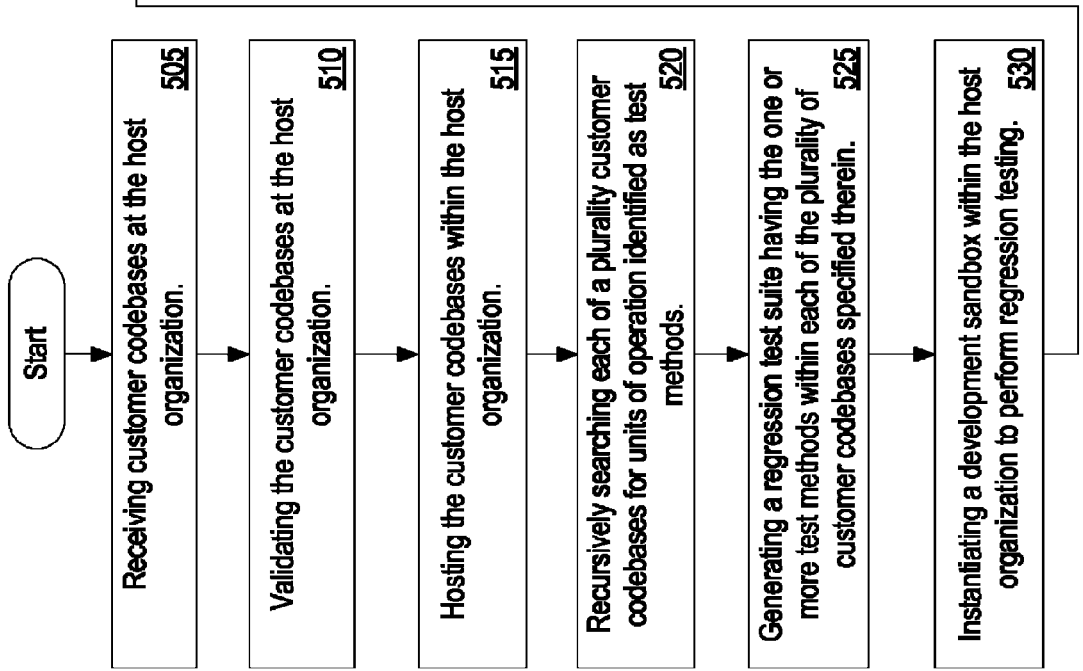

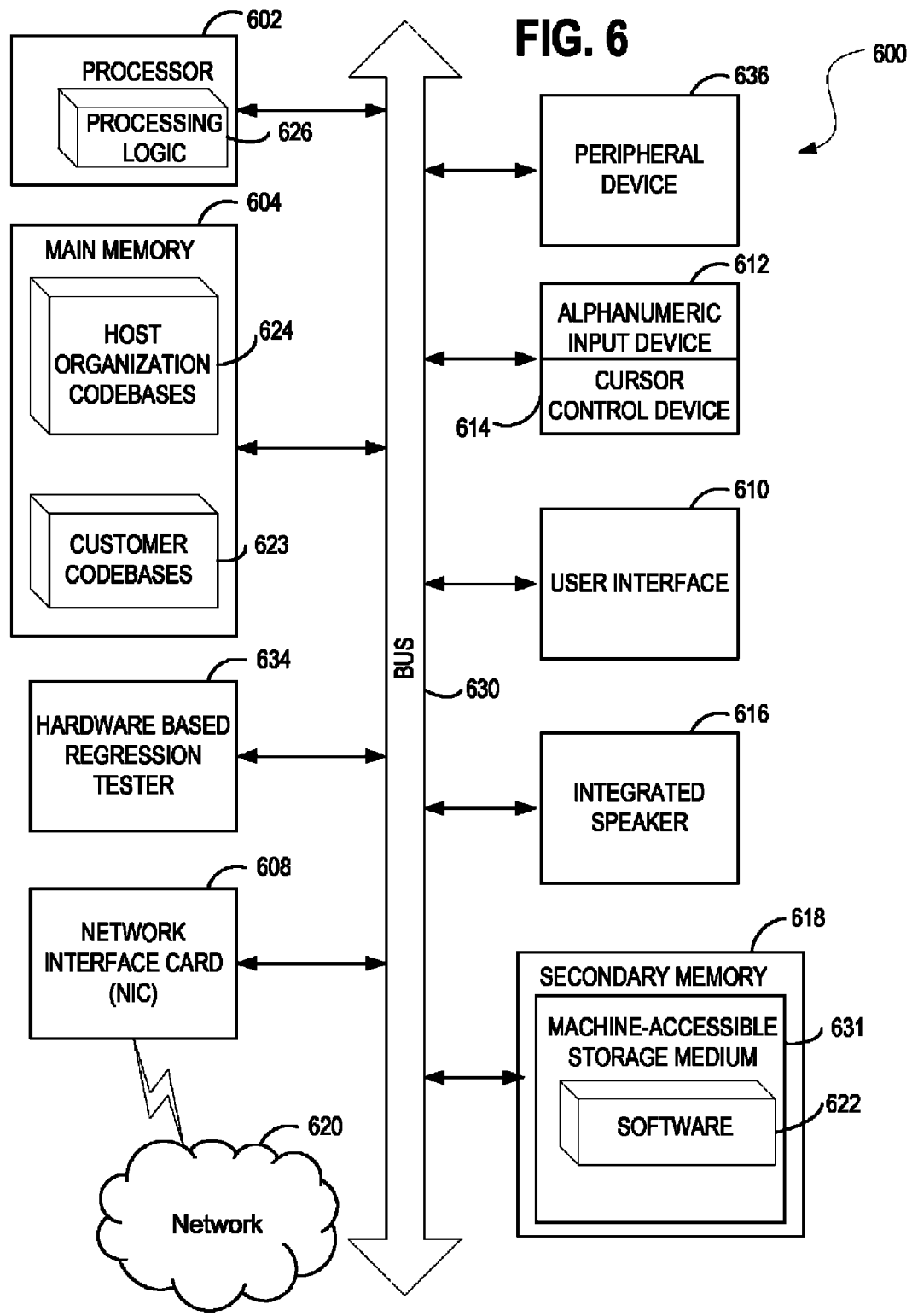

METHODS AND SYSTEMS FOR TESTING METHODS IN A MULTI-TENANT DATABASE ENVIRONMENT

CLAIM OF PRIORITY

This application is related to, and claims priority to, the provisional utility application entitled "METHODS AND SYSTEMS FOR TESTING METHODS IN A MULTI-TENANT DATABASE ENVIRONMENT," filed on May 18, 2010, having an application No. 61/345,979, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of computing, and more particularly, to methods and systems for testing methods in a multi-tenant database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

When making changes to software and code to be released into a production or live environment in which the software is utilized by customers or a business, it is important to test the software to ensure appropriate operation upon its release. Business Enterprises may expend substantial time, cost, and effort to ensure that changes to its codebase do not interrupt normal business operations once released into a production environment as doing so may cause harm to the business in the form of opportunity costs, reputational costs, etc.

Conventional testing models and release cycles are limited in their scope and ability to identify potential errors or compatibility issues because the business Enterprise typically must develop its own custom test cases to test its own custom codebase.

The present state of the art may benefit from the methods and systems for testing methods in a multi-tenant database environment as described herein.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 5 is a flow diagram illustrating a method for testing methods in a multi-tenant database environment in accordance with one embodiment; and FIG. 6 illustrates a diagrammatic representation of a machine in the exemplary form of a computer system, in accordance with one embodiment.

DETAILED DESCRIPTION

Figure 1:
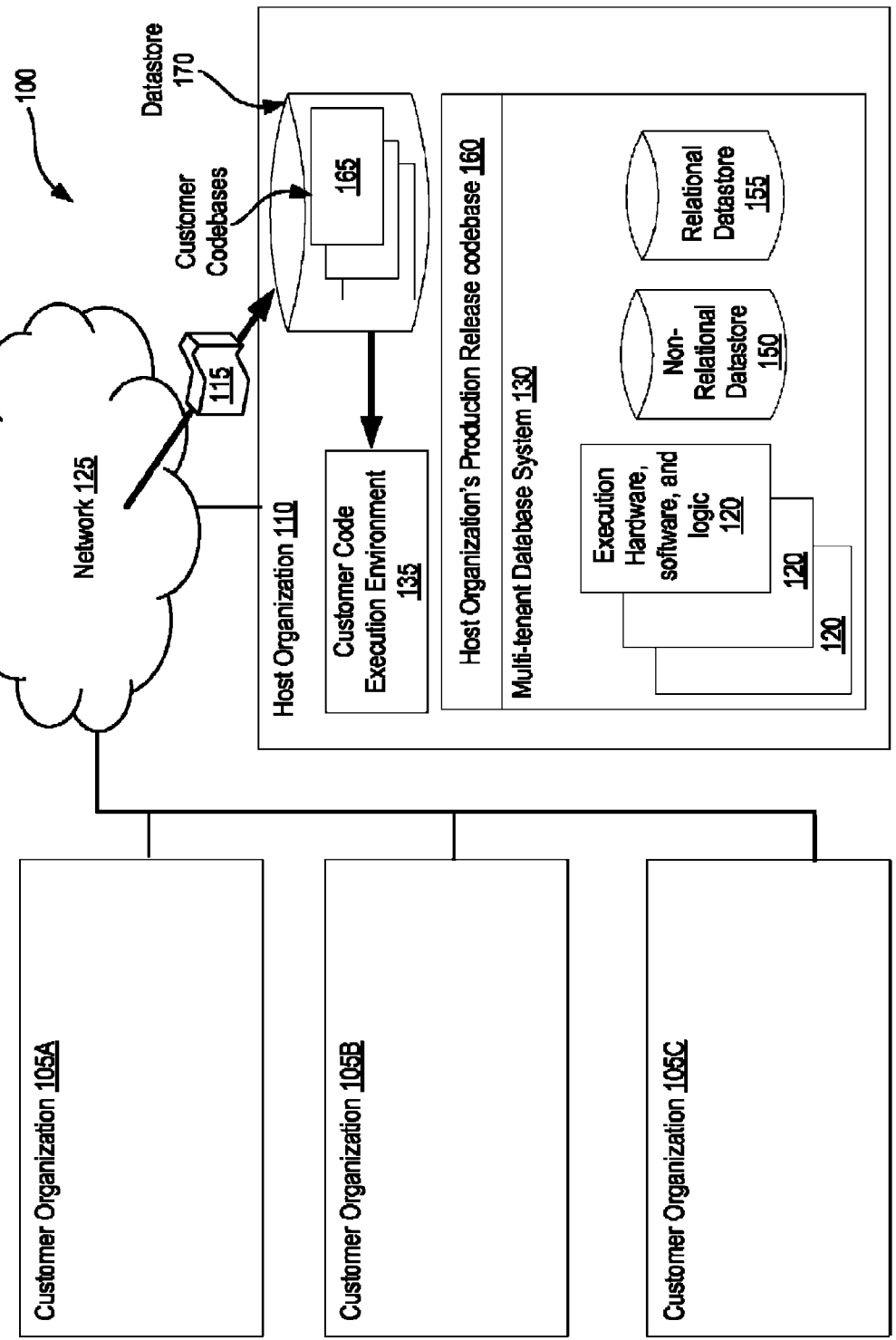
FIG. 1 illustrates an exemplary architecture in which embodiments may operate.

Described herein are systems, devices, and methods for testing methods in a multi-tenant database environment. In one embodiment, such a method includes hosting a plurality of customer codebases within a host organization, where each of the plurality of customer codebases includes a plurality of operational statements and one or more test methods. Such a method further includes generating a first test result set by executing the one or more test methods associated with each of the plurality of customer codebases against a production release codebase of the host organization; generating a second test result set by executing the one or more test methods associated with each of the plurality of customer codebases against a pre-release codebase of the host organization; and identifying errors associated with the pre-release codebase based on a comparison of the first test result set and the second test result set. In accordance with some embodiments, the method may further include instantiating a development sandbox execution environment and executing the test methods against the production release codebase and the pre-release codebase within the development sandbox so as to negate potentially adverse affects on a live production environment utilized by customer organizations and service subscribers of the host organization.

Organizations which develop, test, and release software to customers face the difficult task of ensuring broadly compatible and completely bug-free operation of their code, while at the same time, organizations lack a detailed view of the manner in which their code will be utilized once released. Although customers and business partners may have a vast array of functionality which will eventually be executed against released code provided by such an organization, the organization responsible for developing the released codebase conventionally lacks access to such functionality. Where an organization develops, tests, and releases software for use internally, the organization may have access to functionality which will be executed against the released codebase, however, the available functionality for use in regression testing is limited to only that organization's internal code.

In an on-demand service environment, where a host organization provides computing resources, such as the multi-tenant database system described herein, for use by multiple customer organizations, and provides an execution environment in which such customer organizations may develop and execute their own customer specific codebases, there is an opportunity to leverage the varied codebases provided by the customer organizations and hosted/stored within the host organization for use in regression testing. In such a way, performing regression testing against a pre-release codebase (e.g., for the purposes of backward compatibility, error free execution, compilation, etc.) may provide a more thorough, extensive, and overall higher quality result, potentially negating problems in released production codebases which are used by the customer organizations and relied upon for the operation of their business concerns.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to a system or apparatus for performing the operations described herein. The disclosed system or apparatus may be specially constructed for the required purposes, or may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a computer readable storage medium having instructions stored thereon, causes one or more processors within a host organization to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1 illustrates an exemplary architecture 100 in which embodiments may operate. Architecture 100 depicts a host organization 110 communicably interfaced with several customer organizations (105A, 105B, and 105C) via network 125. Within the host organization 110 is a multi-tenant database system 130 having a plurality of underlying hardware, software, and logic elements 120 therein that implement database functionality and a code execution environment within the host organization 110. The customer code execution environment 135 within the multi-tenant database system 130 provides execution support for the host organization's production release codebase 160 controlled by the host organization 110 and operated by the host organization to provide on-demand services to its customer organizations 105A-C, including on-demand database services and on-demand application execution services.

The hardware, software, and logic elements 120 of the multi-tenant database system 130 are separate and distinct from a plurality of customer organizations (105A, 105B, and 105C) which utilize the services provided by the host organization 110 by communicably interfacing to the host organization 110 via network 125. Additionally depicted within host organization 110 is a customer code execution environment 135 upon which customer codebases 165 belonging to the various customer organizations 105A-C may be executed under the direction and control of the customer organizations 105A-C themselves. Customer codebases 165 may be received at the host organization 110 (e.g., via customer requests 115) and stored upon a datastore 170 within the host organization 110.

In one embodiment, each of the separate and distinct customer organizations (105A-105C) may be remotely located from the host organization 110 that provides services to the customer organizations (105A-105C) via the multi-tenant database system 130 and the customer code execution environment 135 executing therein. Alternatively, one or more of the customer organizations 105A-105C may be co-located with the host organization 110, such as within the same organization that hosts and provides the multi-tenant database system 130 upon which underlying data is persistently stored. Where the customer organizations 105A-C are remote, host organization 110 provides remotely implemented cloud computing services.

In one embodiment, the hardware, software, and logic elements 120 of the multi-tenant database system 130 include at least a non-relational datastore 150 and a relational datastore 155, which operate in accordance with the hardware, software, and logic elements 120 that implement the database functionality and code execution environment within the host organization 110. Host organization 110 receives various customer requests 115 from one or more of the plurality of customer organizations 105A-105C via the network. For example, an incoming customer request 115 may be a login request, a request for services (e.g., triggering code execution or a database transaction), or a request to modify or store data associated with a customer's codebase 165.

Customer requests 115 may be processed via the host organization's production release codebase 160 to perform various operations, such as database transactions, etc. Where functionality associated with a customer codebase 165 is invoked, such functionality may execute within the customer code execution environment 135 as supported by (e.g., executed against) the host organization's production release codebase 160, which in turn operates in conjunction with the multi-tenant database system 130.

Figure 2:
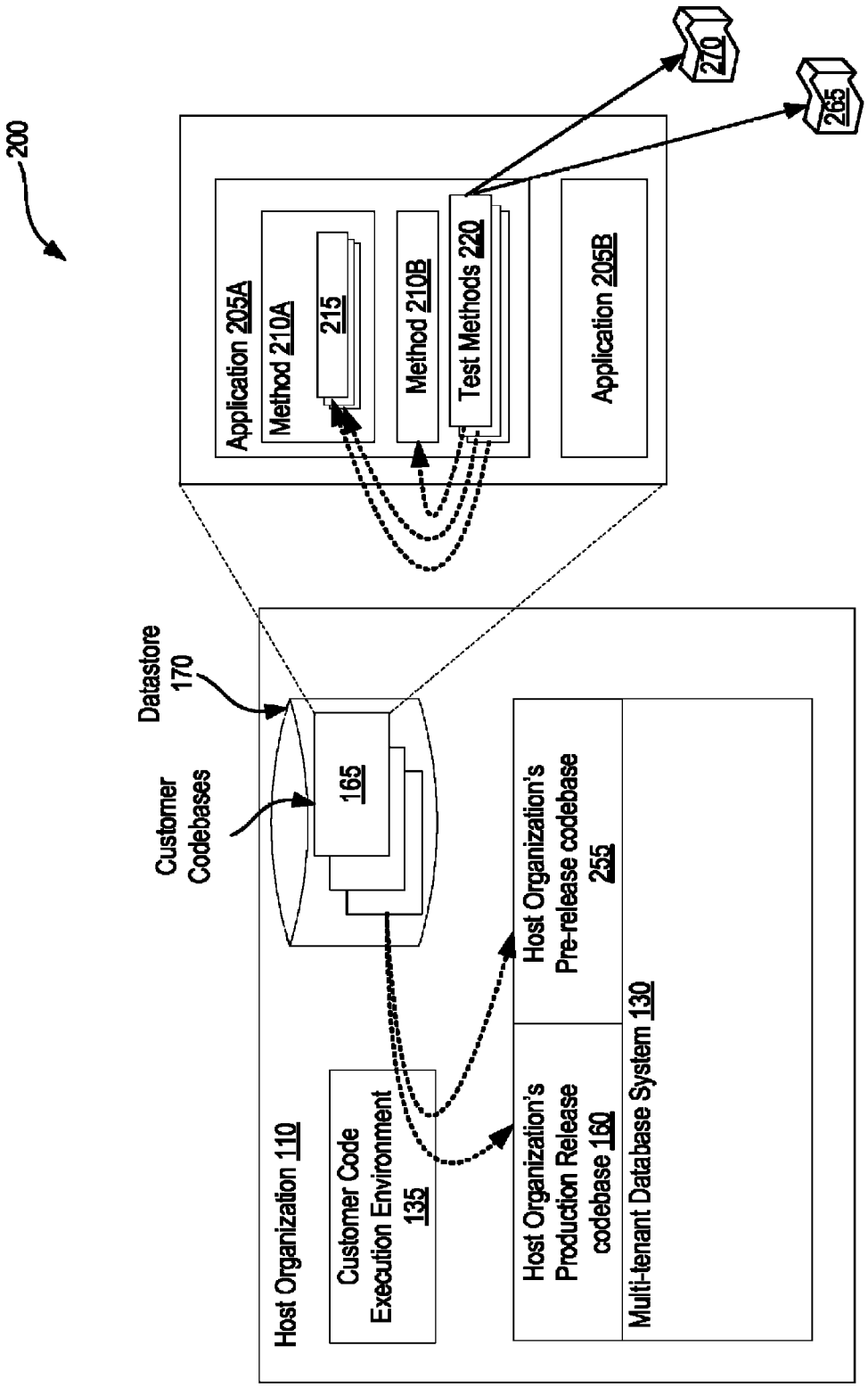
FIG. 2 illustrates an alternative exemplary architecture in which embodiments may operate.

FIG. 2 illustrates an alternative exemplary architecture 200 in which embodiments may operate.

In accordance with one embodiment, the host organization 110 hosts a plurality of customer codebases 165 within the host organization, where each of the plurality of customer codebases have a plurality of operational statements 215 and one or more test methods 220. Hosting the customer codebases 165 may include storing them within a datastore 170 of the host organization 110 or alternatively, storing them within the multi-tenant database system 130 of the host organization 110 which in turn persistently stores data upon a non-relational datastore 150, a relational datastore 155, or both. The operational statements 215 within each of the customer codebases 165 may be organized within one or more applications (e.g., 205A and 205B) belonging to one of the customer organizations 105-A-C, organized as a series of methods (e.g., 210A and 210B within application 205A), organized as functional blocks, classes, objects, etc. The one or more test methods 220 provide test coverage for the operational statements 215 making up each customer's respective codebase 165.

For example, depicted are a series of test methods 220 which invoke various operational statements 215 within a customer's codebase 165, and in particular, within method 210A of application 205A. By triggering or invoking the operational statements 215 via test methods 220, the respective customer organizations 105A-C may test and validate their own code, functionality, and software present in their respective customer codebase 165.

Additionally, because host organization 110 hosts and stores the customer codebases 165 within its infrastructure, the host organization has the capability of "viewing" or otherwise accessing the various test methods 220 associated with its customer organization's 105A-C software and applications 205A-B as such test methods 220 are present within the hosted customer codebases 165. The host organization 110 may therefore leverage the test methods 220 belonging to (e.g., controlled by, maintained by, authored by, provided by, owned by) one or more of its customer organizations 105A-C to perform regression testing upon the host organization's code base which is used to provide services to the customer organizations 105A-C. In some embodiments, customer organizations 105A-C may opt-in or opt-out of participating in regression testing performed by the host organization or otherwise specify that their respective customer codebases 165 are either available or not available to be viewed or accessed by the host organization 110.

In accordance with one embodiment, the host organization performs regression testing by generating a first test result set 265 by executing the one or more test methods 220 associated with each of the plurality of customer codebases 165 against a production release codebase 160 of the host organization 110. In such an embodiment, the host organization 110 further generates a second test result set 270 by executing the one or more test methods 220 associated with each of the plurality of customer codebases 165 against a pre-release codebase 255 of the host organization 110. Execution of the customer organization's 105A-C test methods 220 may utilize the customer code execution environment 135 (e.g., execute on application servers and other computing resources available for executing functionality within the customer codebases 165).

In accordance with such an embodiment, the host organization further identifies errors associated with the pre-release codebase 255 based on a comparison of the first test result set 265 and the second test result set 270.

In the above exemplary embodiment, the production release codebase 160 of the host organization may be considered the "stable" or "live" variant of the host organization's production release codebase 160, and thus, may be considered as a baseline upon which to measure the quality, stability, and backward compatibility of upgrades, bug-fixes, and other types of changes which are present in the host organization's pre-release codebase 255. The pre-release codebase 255 may be considered a "release candidate" or "beta code" which embodies various operational changes and enhancements the host organization 110 wishes to release but which require additional testing, including regression testing, before the pre-release codebase 255 may be appropriately released and promoted to the state of a production release codebase 160 for the host organization 110.

By performing analysis and comparing the test result sets 265 and 270 resulting from executing the test methods 220 against the host organization's production release codebase 160 and re-executing the test methods 220 against the host organization's pre-release codebase 255, a better understanding may be attained as to how the host organization's pre-release codebase 255 may affect the various applications 205A-B and functionality belonging to the host organization's customers. The host organization 110 may seek to ensure backward compatibility for its customers or work to proactively address potential errors that may result from the host organization upgrading or otherwise modifying its production release codebase 160 (e.g., such as by releasing and promoting the pre-release codebase to a production release codebase).

In accordance with one embodiment, the host organization 110 provides on-demand database services to a plurality of customer organizations 105A-C via the multi-tenant database system 130 of the host organization 110. In such an embodiment, multi-tenant database system 130 operates in conjunction with the production release codebase 160 of the host organization 110 and each of the plurality of customer codebases 165 hosted within the host organization 110 are associated with a corresponding one of the plurality of customer organizations 105A-C. The customer organizations each operate distinct from the host organization 110, and may be physically and geographically remote from the host organization 110. Nevertheless, the customer codebases 165 associated with the various customer organizations 105A-C reside within the host organization 110.

In accordance with one embodiment, the production release codebase 160 of the host organization is maintained and controlled by the host organization 110 and each of the plurality of customer codebases 165 hosted by the host organization 110 are maintained and controlled by a corresponding customer organization 105A-C which subscribes to on-demand database services provided by the host organization.

In accordance with some embodiments, each of the customer organizations have authority to view, alter, and execute a corresponding one of the plurality of customer codebases 165 (e.g., the customer codebase belonging to that particular customer organization). In such an embodiment, the host organization has authority to view, alter, and execute the production release codebase 160 of the host organization. In such an embodiment, the host organization has further authority execute the one or more test methods 220 associated with each of the plurality of customer codebases 165. In such embodiments, each of the various customer organizations 105A-C may not have authority to view, alter, or execute other customer codebases 165 besides their own. Additionally, each of the customer organizations 105A-C may not have authority to view, alter, or execute the host organization's production release codebase 160 or the host organization's pre-release codebase 255. The customer organizations 105A-C may, however, have authority to invoke various functions and methods embodied within codebases belonging to the host organization where such functions, methods, and functionality are exposed via, for example, interfaces (e.g., Application Programming Interfaces (APIs), User Interfaces (UIs), Graphical User Interfaces (GUIs), web interfaces, public classes, etc.). Conversely, the host organization 110 may have authority to access, view, and execute customer codebases belonging to its customer organizations 105A-C that are stored and/or hosted within the host organization 110. In particular, the host organization 110 may view and invoke test methods 220 belonging to the various customer organizations.

In accordance with one embodiment, the host organization receives each of the plurality of customer codebases 165 from a respective one of the plurality of customer organizations 105A-C and uniquely associates each of the plurality of customer codebases 165 with one of the plurality of customer organizations 105A-C based on an Organizational Identifier (OrgID) and/or User Identifier (UserID). In such an embodiment, the host organization 110 stores each of the plurality of customer codebases 165 received within a datastore 170 of the host organization 110. For example, the host organization 110 may store a received customer codebase 165 in a storage space allocated to a particular customer organization based on the OrgID and/or UserID associated with the received customer codebase 165.

The received customer codebase 165 is not necessarily received as a total unit, complete application, or as a single package (e.g., attached to an incoming customer request 115), although it may be. Rather, the received customer codebase 165 may result from a synchronization between a locally modified copy of the customer codebase 165 in which the various applications 205A-B, methods 210A-B, test methods 220, and/or operational statements 215 are modified locally at a customer organization's 105A-C location and then uploaded/synchronized to the host organization 110. Alternatively, the customer organizations 105A-C may communicate remotely with the host organization 110 and modify an existing customer codebase 165 through an interface, such as an on-line/on-demand development environment provided by the host organization. Alternatively, the customer organizations may send new or updated classes, objects, methods, test methods and/or operational statements to the host organization for inclusion with a specified customer codebase 165.

In one embodiment, the host organization 110 may establish a policy or requirement that its customer organizations 105A-C establish a minimum amount of code coverage for any application (e.g., 205A-B), method (210A-B) or set of operational statements 215 present in a customer's codebase 165. Such code coverage is provided through the associated test methods 220. For example the host organization may establish a minimum code coverage threshold of 75%, by way of example, and then require that each customer's codebase 165 adhere to the established minimum code coverage threshold.

In one embodiment, the host organization further performs code coverage validation on each of the plurality of customer codebases 165. In one embodiment, performing the code coverage validation for each customer codebase includes generating a statement count by identifying each of the plurality of operational statements within the customer codebase (e.g., each operational statement 215 may be tagged and counted as a statement). Other units of execution may be used for counting purposes, such as declared methods, etc.

Code coverage validation may further include generating a tested statement count by executing the one or more test methods 220 within the customer codebase 165 and identifying which of the plurality of operational statements 215 are invoked via the one or more test methods 220. Ideally, all operational statements 215 present in a customer's codebase 165 are capable of being invoked or triggered by one or more associated test methods 220 resulting in 100% code coverage. However, some operational statements 215 may be invoked multiple times while other operational statements 215 may be present within the customer's codebase 165, yet never referenced or invoked by the one or more test methods 220 resulting in a less than complete or less than 100% code coverage. Where operational statements 215 exist within a customer's codebase 165 and yet are not invoked by any of its test methods 220, there is a risk that an unknown error may escape detection. Accordingly, it is advantageous to the customer organizations 105A-C to ensure as much code coverage as feasible within their respective customer codebases 165, thus maximizing the stability of their own customer applications (e.g., 205A-B) throughout release cycles. Higher code coverage within the customer's codebases 165 may further enhance the scope, depth, and rigor of regression testing performed by the host organization 110.

Code coverage validation may further include calculating a test coverage percentage based on a comparison of the statement count and the tested statement count and comparing the test coverage percentage against a minimum test coverage ratio specified by the host organization 110. Depending on whether a customer codebase 165 passes validation, the host organization may undertake various actions. For example, the host organization may prevent use and execution of all or portions (e.g., allow some applications but not others) of the customer codebase 165 based on the validation results, notify a corresponding customer organization 105A-C that their customer codebase 165 fails to adhere to the minimum level of code coverage, and so forth.

In one embodiment, the host organization generates a regression test suite, for example, to perform regression testing against a pre-release codebase 255 of the host organization.

For example, the host organization may generate or create a regression test suite having the one or more test methods 220 associated with each of the plurality of customer codebases 165 specified therein by recursively searching each of the plurality customer codebases 165 for units of operation self labeled as test methods 220 or otherwise detectable as test methods 220. The host organization may then register, list, link, or include each discovered test method 220 within the regression test suite. The resulting test suite may therefore include numerous test methods 220 associated with multiple distinct customer codebases 165. Such a test suite may encompass all available test methods 220 available within the host organization's datastore 170 upon which the various customer codebases 165 are stored, or may include a subset based on selected criteria, such as a specified or enumerated list of customer organizations 105A-C.

In one embodiment, generating the first test result set 265 includes executing the regression test suite as supported by (e.g., executed against) the production release codebase 160 of the host organization 110 and capturing output from the execution of the regression test suite as the first test result set 265. In such an embodiment, generating the second test result set 270 may include re-executing the regression test suite (e.g., running/executing the identical list or grouping of test methods 220) as supported by (e.g., executed against) the pre-release codebase 255 of the host organization 110 and capturing output from the re-execution of the regression test suite as the second test result set 270. For example a first run of the regression test suite is performed on the baseline code (e.g., the host organization's production release codebase 160) and then a second re-execution of the same regression test suite is performed on the modified code (e.g., the host organization's pre-release codebase 255).

In one embodiment, the production release codebase 160 of the host organization represents the currently released and currently operating implementation logic to support on-demand services provided by the host organization 110 and the pre-release codebase 255 of the host organization represents an upgraded variant of the production release codebase 160 having functionality which requires regression testing against available test methods 220 to ensure backward compatibility between the pre-release codebase 255 of the host organization and the plurality of customer codebases 165 hosted by the host organization.

In one embodiment, the plurality of operational statements 215 within each of the customer codebases 165 syntactically adhere to an Apex On-Demand compatible programming language. In such an embodiment, a plurality of customer organizations 105A-C create customer specific applications (e.g., 205A-B) in the Apex On-Demand compatible programming language via the plurality of operational statements 215 within each of the customer codebases 165.

In accordance with disclosed embodiments, the production release codebase 160 of the host organization provides Application Programming Interfaces (APIs) to the customer specific applications (e.g., 205A-B). For example, the APIs may enable the customer specific applications 205A-B to perform operations against the multi-tenant database system 130 executing within the host organization 110 that operates in conjunction with the production release codebase 160.

In accordance with one embodiment, identifying errors associated the pre-release codebase 255 of the host organization based on a comparison of the first test result set 265 and the second test result set 270 includes identifying one or more incompatibilities between the customer specific applications (e.g., 205A-B) and the pre-release codebase 255 of the host organization 110. For example, identifying errors associated with the pre-release codebase 255 may be based on a comparison of the first test result set 265 and the second test result set 270 in an effort to find or identify a change in an output from, for example, the same test method 220 when run on each of the respective codebases of the host organization. Some changes such as a distinct time-stamp or a distinct user name may be inconsequential and thus be ignored. Other changes however may highlight problems or issues that are exhibited when a customer's codebase 165 associated with the test method 220 in question is executed against the host organization's pre-release codebase 255 (e.g., if the pre-release codebase 255 were released to production without a change, correction, or bug-fix). For example, changes in output including messages, exit states, exit codes, total execution time, and so forth may be detected and subject to further analysis.

In one embodiment, the customer organizations 105A-C have no means or mechanism by which to execute their test methods 220 against pre-release codebases 255 of the host organization, and thus, are unable to detect errors resulting from an upgrade until new upgraded code is released to production. Thus, in accordance with some embodiments, the host organization performs the appropriate regression testing on behalf of the customer organizations 105A-C utilizing the customer organization's respective test methods 220 to minimize the potential for future errors resulting from a codebase upgrade by the host organization 110.

In accordance with one embodiment, identifying errors associated with the pre-release codebase 255 of the host organization 110 based on a comparison of the first test result set 265 and the second test result set 270 includes eliminating output from each of the first test result set 265 and the second test result set 270 based on a set of criteria. The resulting dataset therefore includes output from those test methods 220 which require further investigation or which are potential errors relating specifically to the use of the host organization's pre-release codebase 255.

For example, criteria for eliminating output from the first test result set 265 and the second test result set 270 may include: a) where corresponding test method outputs in the first test result set 265 and the second test result set 270 each indicate a successful result (e.g., if both pass, there may be little value in reviewing the output); b) where a test method output in the first test result set 265 indicates failure and a corresponding test method output in the second test result set 270 indicates success (e.g., if the new pre-release codebase 255 corrects a problem, it may be unnecessary to review the output); c) where corresponding test method outputs in the first test result set 265 and the second test result set 270 indicate identical failure modes (e.g., where a pre-existing failure using the production release codebase 160 remains a failure using the pre-release codebase 255 it may be acceptable to eliminate the output on the basis that the output is more likely attributable to the customer codebase 165 in question rather than the host organization's pre-release codebase 255); d) where corresponding test method outputs in the first test result set and the second test result set indicate identical compilation error; and e) where a test method output in the first test result set 265 and/or a corresponding test method output in the second test result set 270 matches one or more regular expressions set forth in an enumerated list of elimination patterns (e.g., some outputs from test methods 220 may be known "noise" or false-positives or otherwise correspond to known events that have been investigated and deemed to be of no value or are otherwise appropriate for elimination from the first test result set 265 and the second test result set 270).

Figure 3:
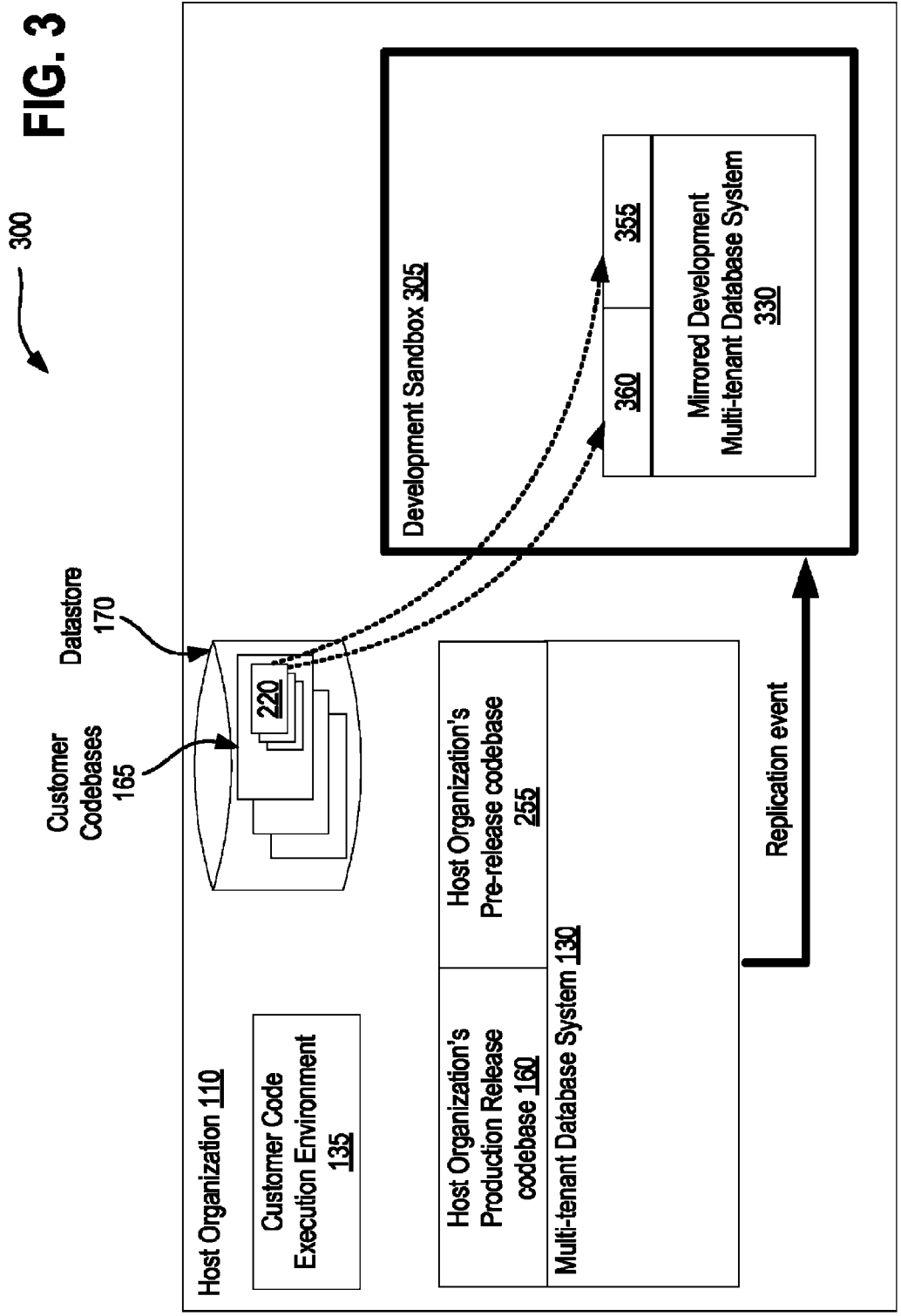
FIG. 3 illustrates an alternative exemplary architecture in which embodiments may operate.

FIG. 3 illustrates an alternative exemplary architecture 300 in which embodiments may operate. In particular, depicted is a development sandbox 305 having a replicated copy of the multi-tenant database system 330 therein.

In one embodiment, when generating the first test result set and generating the second test result set, the host organization 110 establishes a development sandbox 305 so as to prevent a potentially adverse impact to its customer organizations 105A-C. For example, it may be undesirable to consume a large amount of computational resources, including bandwidth, memory, processor cycles, etc., within a live production environment because consumption of these resources may degrade performance for uses of the production system. Moreover, some of the test methods 220 within the customer codebases 165 may initiate transactions to a connected multi-tenant database system, potentially causing undesirable data changes or unexpected data results.

Therefore, in accordance with one embodiment, the host organization 110 generates the first test result set and generating the second test result set by executing the one or more test methods 220 associated with each of the plurality of customer codebases 165 against the pre-release codebase 355 of the host organization within a development sandbox 305 having an execution environment within the host organization that is populated with replicated data mirrored from a live production multi-tenant database system of the host organization. In such an embodiment, execution of the test methods (e.g., 220) within the development sandbox are prevented from having any affect upon data within the live production multi-tenant database system 130 of the host organization 110.

For example, in one embodiment, the host system instantiates a development sandbox 305 within the host organization 110, within which regression testing and other such development activities may be performed. In such an embodiment, the host organization further replicates a live production multi-tenant database system 130 of the host organization 110 to a mirrored development multi-tenant database system 330 within the development sandbox 305. The mirrored development multi-tenant database system 330 may embody a similar or identical architecture so as to facilitate testing in an environment which simulates the live operational multi-tenant database system 130, and may further have a replicated copy of data within the multi-tenant database system 130, but is isolated to the development sandbox 305 and constrained in such a way that transactions and operations taking place on the mirrored development multi-tenant database system 330 have no affect on the live operational multi-tenant database system 130.

In accordance with such an embodiment, the host organization 110 may further instantiate the production release codebase 360 within the development sandbox 305 upon the mirrored development multi-tenant database system 330, thus causing the mirrored development multi-tenant database system 330 within the development sandbox 305 to operate in conjunction with the production release codebase 360 instantiated within the development sandbox. In such an embodiment, the host organization generates the first test result set by executing the one or more test methods 220 associated with each of the plurality of customer codebases 165 against the production release codebase 360 of the host organization 110 within the development sandbox 305.

In one embodiment, the host organization 110 further performs a rollback of any change to the mirrored development multi-tenant database system 330 within the development sandbox 305 resulting from execution of the one or more test methods 220 associated with each of the plurality of customer codebases 165. The host organization 110 may further terminate the instantiated instance of the production release codebase 360 within the development sandbox 305, upgrade to the pre-release codebase 355 within the development sandbox 305, and instantiate the pre-release codebase 355 within the development sandbox 305 upon the mirrored development multi-tenant database system 330. For example, the host organization may install patches, updates, introduce additional code into the production release codebase 360 within the development sandbox 305, or otherwise modify the operational codebase so as to attain the host organization's pre-release codebase 355 within the development sandbox 305.

In such an embodiment, the host organization 110 further generates the second test result set by executing the one or more test methods 220 associated with each of the plurality of customer codebases 165 against the pre-release codebase 355 of the host organization 110 comprises within the development sandbox 305.

In accordance with some embodiments, the host organization 110 may implement additional live production data safeguards. For example, one data safeguard includes the host organization replicating the production release codebase 160 of the host organization 110 and a multi-tenant database system 130 operating in conjunction with the production release codebase 160 to a development sandbox 305 as described above.

The host organization may terminate Simple Network Management Protocol (SNMP) capabilities within the development sandbox 305 to prevent remote execution of functionality external to the development sandbox 305 by executing functionality within the development sandbox 305. For example, some functionality triggered by the test methods 220 may potentially invoke remote procedure calls or other such remote events which reference and attempt to trigger actions external to the development sandbox 305. Terminating SNMP and similar capabilities may prevent such remote events from succeeding to escape the development sandbox 305.

In one embodiment, the host organization may configure datastores within the host organization 110 to be read-only from within the development sandbox 305. For example, the host organization may allow datastore 170 or a similar data repository to be accessible from functionality executing within the development sandbox 305, but implement a read-only policy so as to prevent changes. Alternatively, a replicated datastore may be established. In some embodiments, a copy on write policy may be employed allowing reads as normal, but forcing writes to first copy the specified write location to a temporary space utilized by the development sandbox 305 and then allowing the requesting function to write to the temporary space rather than writing to the originally specified location. Alternatively, the host organization may create a temporary writable datastore to accept any write attempts invoked by execution within the development sandbox 305.

In one embodiment, the host organization configures the replicated multi-tenant database system (e.g., a replicated development multi-tenant database system 330) within the development sandbox 305 to implement a policy to accept but not commit database transactions. Such a policy may enable rollback of all transactions performed against the replicated multi-tenant database system (e.g., 330 or similar). Performing such a roll back operation may permit the host organization to perform multiple iterations of regression testing or of other such tests without corrupting the underlying replicated copy of the database, which may result in sub-optimal data results if database transactions were to otherwise be permanently committed.

Various configuration optimizations may be utilized in accordance with described embodiments. For example, the host organization 110 may specify organizational identifiers (OrgIds) to be utilized in regression testing, thus allowing the selection and execution of only test methods 220 associated with a specified set of customer organizations rather than all organizations recognized. Heap size, use of simultaneously executing threads, modified path settings, and so forth may be configured so as to enable appropriate references to point to the development sandbox 305 or to a read-only mount of a datastore, or enable parallelizing execution as appropriate.

Figure 4:
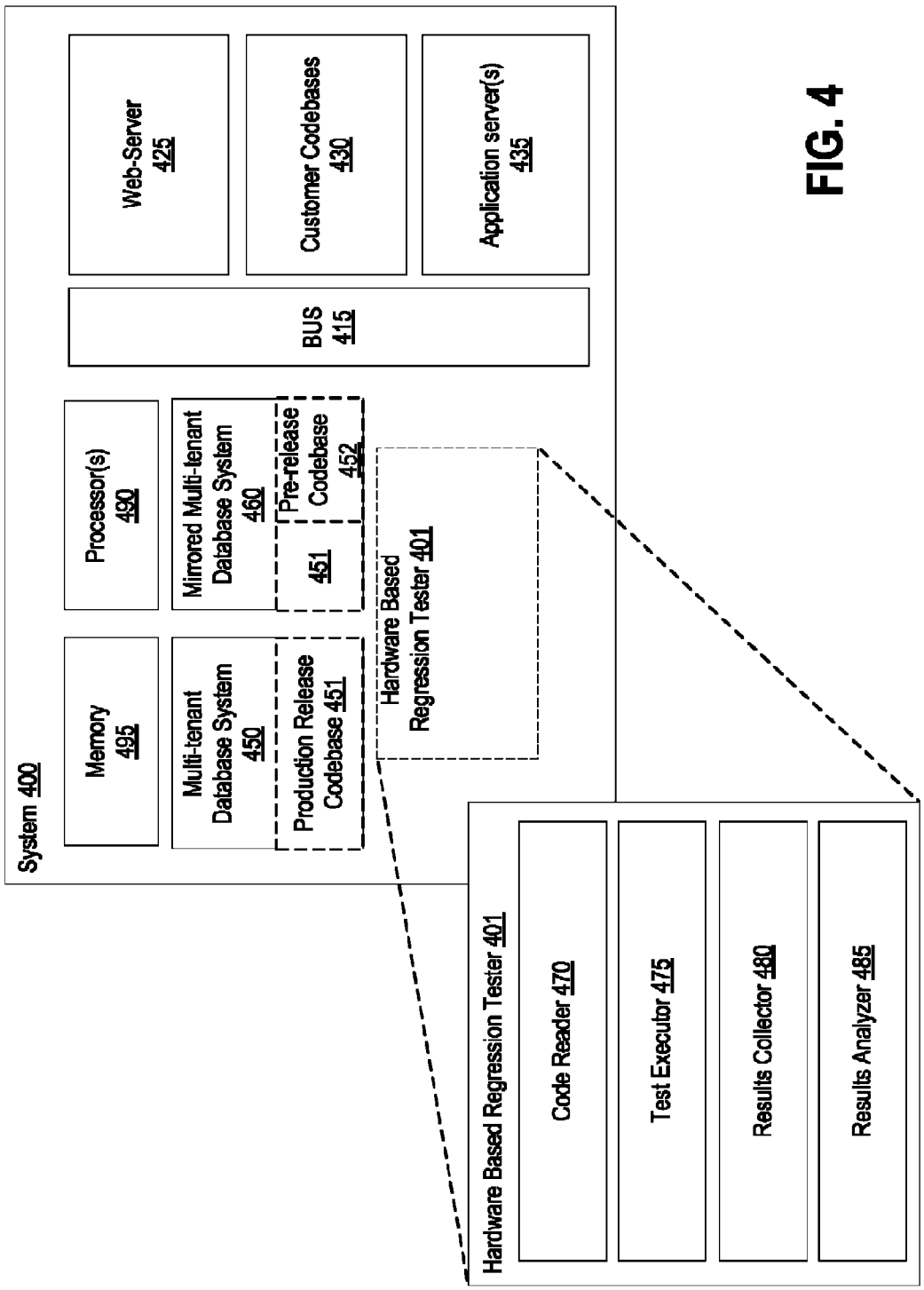
FIG. 4 shows a diagrammatic representation of a system in which embodiments may operate, be installed, integrated, or configured.

FIG. 4 shows a diagrammatic representation of a system 400 in which embodiments may operate, be installed, integrated, or configured.

In one embodiment, system 400 includes a memory 495 and a processor or processors 490. For example, memory 495 may store instructions to be executed and processor(s) 490 may execute such instructions. System 400 includes bus 415 to transfer transactions and data within system 400 such as database transactions, execution requests and API method invocations among a plurality peripheral devices and components interfaced with bus 415. System 400 further includes web-server 425, for example, to receive requests, return responses, and otherwise interface with remote clients, such as client devices located within customer organizations 105A-C. Customer codebases 430 provides a repository for codebases belonging to customers of a host organization, such as one or more of customer organizations 105A-C as set forth in FIG. 1. Application server(s) 435 provides computational resources and an execution environment in which customer organizations may execute applications and other functionality embodied within their respective customer codebases 430.

System 400 includes a multi-tenant database system 450 which operates in conjunction with an instance of production release codebase 451. System 400 further includes a mirrored multi-tenant database system 460 in which instances of a host organization's production release codebase 451 and pre-release codebase 452 are available to operate in conjunction with or in support of the mirrored multi-tenant database system 460. Mirrored multi-tenant database system 460 may be isolated to a development sandbox or otherwise firewalled and prevented from impacting a live or production based environment, such as multi-tenant database system 450.

Distinct within system 400 is hardware based regression tester 401 which includes code reader 470, test executor 475, results collector 480, and results analyzer 485. In accordance with one embodiment, code reader 470 provides a search and discovery mechanism to recursively traverse available customer codebases, such as those at element 430, and identify test methods. Code reader may further provide logic for conducting validation of customer codebases, for example, to ensure test code coverage adheres to a specified requirement. Code reader 470 may build a regression test suite based on the results of its search and discovery mechanism. Test executor 475 executes test methods, such as those discovered by code reader 470, against the host organization's production release codebases including production release codebases 451 and pre-release codebases 452. Results collector 480 collects the results from the test methods executed, including output (e.g., console output, log output, etc.). Results analyzer 485 provides an analysis mechanism used to compare results output from the execution and re-execution of a regression test suite or specified test methods as described herein (e.g., comparing the results from execution of a regression test suite against a production release codebase 451 and the results from execution of a regression test suite against a pre-release codebase 452.

FIG. 5 is a flow diagram illustrating a method 500 for testing methods in a multi-tenant database environment in accordance with one embodiment, including receiving and storing customer codebases, performing search and discovery for test methods, executing test methods against production and pre-release codebases of a host organization, collecting result sets, and comparing result sets in accordance with certain embodiments. Method 500 may be performed by processing logic that may include hardware (e.g., circuitry, dedicated logic, programmable logic, microcode, etc.), software (e.g., instructions run on a processing device to perform various operations such receiving customer codebases, searching the customer codebases for test methods, executing test methods, analyzing results, etc., or a combination thereof. In one embodiment, method 500 is performed by hardware logic, such as the hardware based regression tester depicted at element 401 of FIG. 4. Some of the blocks and/or operations listed below are optional in accordance with certain embodiments. The numbering of the blocks presented is for the sake of clarity and is not intended to prescribe an order of operations in which the various blocks must occur.

Method 500 begins with processing logic receiving customer codebases at the host organization (block 505). For example, receiving applications, methods, functions, logic, operational statements, test methods, etc., from one or more customer organizations for storage within a customer organization's respective customer codebase. At block 510, processing logic validates the customer codebases at the host organization. For example, ensuring it complies with a minimum required level of code coverage via test methods.

At block 515, processing logic causes a host organization to host or store the customer codebases within the host organization.

At block 520, processing logic recursively searches each of a plurality customer codebases for units of operation identified as test methods. This test method discovery mechanism may be automated and triggered periodically to discover all test methods available within a host organization or only those test methods associated with a specified one or more customer organizations.

At block 525, processing logic generates a regression test suite having the one or more discovered test methods within each of the plurality of customer codebases specified therein.

At block 530, processing logic instantiates a development sandbox within the host organization to perform regression testing and at block 535, processing logic replicates a live production multi-tenant database system of the host organization to a mirrored development multi-tenant database system within the development sandbox for use with the regression testing.

At block 540, processing logic generates a first test result set by executing the regression test suite against a production release codebase of the host organization and at block 545, processing logic generates a second test result set by re-executing the regression test suite against a pre-release codebase of the host organization. A results collector may collect the results into central location or a specified location for analysis.

At block 550, processing logic identifies errors associated with the pre-release codebase based on a comparison of the first test result set and the second test result set. The identified errors may then be stored for later review or sent to an operator for review.

FIG. 6 illustrates a diagrammatic representation of a machine 600 in the exemplary form of a computer system, in accordance with one embodiment, within which a set of instructions, for causing the machine 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives and persistent multi-tenant database implementations), which communicate with each other via a bus 630. Main memory 604 includes host organization codebases 624, including production release codebases and pre-release codebases requiring regression testing, each capable of operating in conjunction with a multi-tenant database system of the host organization codebases 624. Main memory 604 further includes customer codebases 623, each corresponding to a customer organization and each providing one or more operational statements making up methods, functionality and applications of the customer organization, and further including one or more test methods to provide test coverage for the various operational statements within the customer codebases 623. Main memory 604 and its sub-elements (e.g. 623 and 624) are operable in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc. The computer system 600 may further include a Hardware based regression tester 634 to implement regression testing capabilities for testing methods and functionality provided by customer organizations within their respective customer codebases against codebases of a host organization.

The secondary memory 618 may include a non-transitory machine-readable storage medium (or more specifically a non-transitory machine-accessible storage medium) 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method in a host organization, wherein the method comprises:
   hosting a plurality of customer codebases within the host organization, each of the plurality of customer codebases having a plurality of operational statements and one or more test methods, the plurality of customer codebases belonging to customer organizations and executable under the direction and control of the customer organizations;
   the host organization performing regression testing by:
   (i) the host organization executing the one or more test methods belonging to the customer organizations against a production release codebase of the host organization to generate a first test result set;
   (ii) the host organization again executing the one or more test methods belonging to the customer organizations against a pre-release codebase of the host organization to generate a second test result; and
   (iii) the host organization identifying errors associated with the pre-release codebase based on a comparison of the first test result set and the second test result set.

2. The method of claim 1, further comprising:
   providing on-demand database services to a plurality of customer organizations via a multi-tenant database system of the host organization, wherein the multi-tenant database system operates in conjunction with the production release codebase of the host organization; and
   wherein each of the plurality of customer codebases hosted within the host organization are associated with a corresponding one of the plurality of customer organizations.

3. The method of claim 2, wherein the multi-tenant database system comprises elements of hardware and software that are shared by the plurality of customer organizations, each customer organization being a remotely located separate and distinct entity from the host organization having the multi-tenant database system and the production release codebase executing therein.

4. The method of claim 1:
   wherein the production release codebase of the host organization is maintained and controlled by the host organization; and
   wherein each of the plurality of customer codebases hosted by the host organization are maintained and controlled by a corresponding customer organization which subscribes to on-demand database services provided by the host organization.

5. The method of claim 4:
   wherein each of the customer organizations have authority to view, alter, and execute a corresponding one of the plurality of customer codebases;
   wherein the host organization has authority to view, alter, and execute the production release codebase of the host organization; and
   wherein the host organization has further authority execute the one or more test methods associated with each of the plurality of customer codebases.

6. The method of claim 1, further comprising:
   receiving each of the plurality of customer codebases from one of the plurality of customer organizations;
   uniquely associating each of the plurality of customer codebases with one of the plurality of customer organizations based on an Organizational Identifier (OrgID) and/or User Identifier (UserID); and
   storing each of the plurality of customer codebases received within a datastore of the host organization.

7. The method of claim 1, further comprising performing code coverage validation on each of the plurality of customer codebases, wherein performing the code coverage validation for each customer codebase comprises:
   generating a statement count by identifying each of the plurality of operational statements within the customer codebase;

generating a tested statement count by executing the one or more test methods within the customer codebase and identifying which of the plurality of operational statements are invoked via the one or more test methods;

calculating a test coverage percentage based on a comparison of the statement count and the tested statement count; and comparing the test coverage percentage against a minimum test coverage ratio specified by the host organization.

8. The method of claim 1, further comprising generating a regression test suite having the one or more test methods associated with each of the plurality of customer codebases specified therein by recursively searching each of the plurality customer codebases for units of operation self labeled as test methods and registering each test method with the regression test suite.

9. The method of claim 8:
wherein generating the first test result set comprises executing the regression test suite against the production release codebase of the host organization and capturing output from the execution of the regression test suite as the first test result set; and
wherein generating the second test result set comprises re-executing the regression test suite against the pre-release codebase of the host organization and capturing output from the re-execution of the regression test suite as the second test result set.

10. The method of claim 1:
wherein the production release codebase of the host organization comprises currently released and currently operating implementation logic to support on-demand services provided by the host organization; and
wherein the pre-release codebase of the host organization comprises an upgraded variant of the production release codebase having functionality which requires regression testing against available test methods to ensure backward compatibility between the pre-release codebase of the host organization and the plurality of customer codebases hosted by the host organization.

11. The method of claim 1:
wherein the plurality of operational statements within each of the customer codebases syntactically adhere to an Apex On-Demand compatible programming language;
wherein a plurality of customer organizations create customer specific applications in the Apex On-Demand compatible programming language via the plurality of operational statements within each of the customer codebases; and
wherein the production release codebase of the host organization provides Application Programming Interfaces (APIs) to the customer specific applications, the APIs enabling the customer specific applications to perform operations against a multi-tenant database system executing within the host organization that operates in conjunction with the production release codebase.

12. The method of claim 11, wherein identifying errors associated the pre-release codebase based on the comparison of the first test result set and the second test result set comprises identifying one or more incompatibilities between the customer specific applications and the pre-release codebase of the host organization.

13. The method of claim 1, wherein identifying errors associated with the pre-release codebase based on a comparison of the first test result set and the second test result set comprises eliminating output from each of the first test result set and the second test result set based on the following criteria:
where corresponding test method outputs in the first test result set and the second test result set each indicate a successful result;
where a test method output in the first test result set indicates failure and a corresponding test method output in the second test result set indicates success;
where corresponding test method outputs in the first test result set and the second test result set indicate identical failure modes;
where corresponding test method outputs in the first test result set and the second test result set indicate identical compilation error; and
where a test method output in the first test result set and/or a corresponding test method output in the second test result set matches one or more regular expressions set forth in an enumerated list of elimination patterns.

14. The method of claim 1, wherein generating the first test result set by executing the one or more test methods associated with each of the plurality of customer codebases against the production release codebase of the host organization and generating the second test result set by executing the one or more test methods associated with each of the plurality of customer codebases against the pre-release codebase of the host organization comprises generating the first test result set and the second test result set within a development sandbox having an execution environment within the host organization that is populated with replicated data mirrored from a live production multi-tenant database system of the host organization, wherein execution of test methods within the development sandbox are prevented from having any affect upon data within the live production multi-tenant database system of the host organization.

15. The method of claim 1, further comprising:
instantiating a development sandbox within the host organization;
replicating a live production multi-tenant database system of the host organization to a mirrored development multi-tenant database system within the development sandbox;
instantiating the production release codebase within the development sandbox upon the mirrored development multi-tenant database system; and
wherein generating the first test result set by executing the one or more test methods associated with each of the plurality of customer codebases against the production release codebase of the host organization comprises executing the one or more test methods associated with each of the plurality of customer codebases within the development sandbox.

16. The method of claim 15, further comprising:
rolling back any change to the mirrored development multi-tenant database system within the development sandbox resulting from execution of the one or more test methods associated with each of the plurality of customer codebases;
terminating the instantiated instance of the production release codebase within the development sandbox;
upgrading to the pre-release codebase within the development sandbox;
instantiating the pre-release codebase within the development sandbox upon the mirrored development multi-tenant database system; and
wherein generating the second test result set by executing the one or more test methods associated with each of the plurality of customer codebases against the pre-release codebase of the host organization comprises executing the one or more test methods associated with each of the plurality of customer codebases within the development sandbox.

17. The method of claim 1, further comprising implementing live production data safeguards comprising:
   replicating the production release codebase of the host organization and a multi-tenant database system operating in conjunction with the production release codebase to a development sandbox;
   terminating Simple Network Management Protocol (SNMP) capabilities within the development sandbox to prevent remote execution of functionality external to the development sandbox by executing functionality within the development sandbox;
   configuring datastores within the host organization to be read-only from within the development sandbox;
   creating a temporary writable datastore to accept any write attempts invoked by executing functionality within the development sandbox; and
   configuring the replicated multi-tenant database system within the development sandbox to implement a policy to accept but not commit database transactions, wherein the policy enables rollback of all transactions performed against the replicated multi-tenant database system.

18. Non-transitory computer readable storage media having instructions stored thereupon that, when executed by a processor of a host organization, the processor causes the host organization to perform operations comprising:
   hosting a plurality of customer codebases within the host organization, each of the plurality of customer codebases having a plurality of operational statements and one or more test methods, the plurality of customer codebases belonging to customer organizations and executable under the direction and control of the customer organizations;
   the host organization performing regression testing by:
   (i) the host organization executing the one or more test methods belonging to the customer organizations against a production release codebase of the host organization to generate a first test result set;
   (ii) the host organization again executing the one or more test methods belonging to the customer organizations against a pre-release codebase of the host organization to generate a second test result; and
   (iii) the host organization identifying errors associated with the pre-release codebase based on a comparison of the first test result set and the second test result set.

19. The non-transitory computer readable storage media of claim 18, wherein the method further comprises:
   providing on-demand database services to a plurality of customer organizations via a multi-tenant database system of the host organization, wherein the multi-tenant database system operates in conjunction with the production release codebase of the host organization; and
   wherein each of the plurality of customer codebases hosted within the host organization are associated with a corresponding one of the plurality of customer organizations.

20. A host organization comprising:
   a processor and a memory;
   a datastore to store a plurality of customer codebases within the host organization, each of the plurality of customer codebases having a plurality of operational statements and one or more test methods, the plurality of customer codebases belonging to customer organizations and executable under the direction and control of the customer organizations;
   the host organization to execute, via a test executor, the one or more test methods belonging to the customer organizations against a production release codebase of the host organization to generate a first test result set;
   the host organization to again execute, via the test executor, the one or more test methods belonging to the customer organizations against a pre-release codebase of the host organization to generate a second test result set;
   the host organization to identify, via a results analyzer errors associated with the pre-release codebase based on a comparison of the first test result set and the second test result set.

* * * * *